US009758027B1

(12) United States Patent
Sia, Jr. et al.

(10) Patent No.: US 9,758,027 B1
(45) Date of Patent: Sep. 12, 2017

(54) VEHICLE DOOR ASSEMBLIES, AND METHODS OF USE AND MANUFACTURE THEREOF

(71) Applicant: Honda Motor Co., Ltd., Tokyo (JP)

(72) Inventors: Generoso Tan Sia, Jr., Plain City, OH (US); Jason Dilley, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/067,092

(22) Filed: Mar. 10, 2016

(51) Int. Cl.
| | |
|---|---|
| *B62D 33/00* | (2006.01) |
| *B60J 10/86* | (2016.01) |
| *E06B 7/22* | (2006.01) |
| *B60J 5/04* | (2006.01) |

(52) U.S. Cl.
CPC ............ *B60J 10/86* (2016.02); *B60J 5/0463* (2013.01); *E06B 7/22* (2013.01)

(58) Field of Classification Search
CPC ........... B60P 3/08; G07B 15/063; B62D 1/28; B62D 21/157; G01S 13/931; G01C 21/28; B60J 5/0402; B60J 5/06; B60J 10/86; B60J 5/0463; E05Y 2900/531; B60R 21/23138; E06B 7/22
USPC ........... 296/39.1, 146.1, 146.2, 146.5, 146.7; 244/129.5
See application file for complete search history.

(56) References Cited

U.S. PATENT DOCUMENTS

| | | | | |
|---|---|---|---|---|
| 3,680,883 A | * | 8/1972 | Keppel | B60R 22/04 |
| | | | | 180/270 |
| 3,694,002 A | * | 9/1972 | Fancy | B60R 22/04 |
| | | | | 280/803 |
| 3,964,208 A | | 6/1976 | Renner et al. | |
| 4,135,760 A | * | 1/1979 | Grossbach | B60J 5/06 |
| | | | | 296/155 |
| 4,319,769 A | * | 3/1982 | Compeau | B60R 22/04 |
| | | | | 280/803 |
| 4,375,876 A | * | 3/1983 | Stewart | B64C 1/1407 |
| | | | | 160/201 |
| 4,658,546 A | * | 4/1987 | Moriyama | E05F 11/382 |
| | | | | 49/227 |

(Continued)

FOREIGN PATENT DOCUMENTS

| | | |
|---|---|---|
| DE | 102007029984 A1 | 2/2008 |
| EP | 2900498 A1 | 8/2015 |
| FR | 2995861 A1 | 3/2014 |

*Primary Examiner* — Kiran B Patel
(74) *Attorney, Agent, or Firm* — Kenealy Vaidya LLP

(57) ABSTRACT

Some embodiments are directed to a door lining assembly for use with a vehicle that defines a vehicle exterior and a vehicle passenger compartment. The door lining assembly can include a base assembly including an outboard base that defines a substantially planar upper surface that extends obliquely relative to a transverse direction of the vehicle so as to face upwardly toward the vehicle exterior. The base assembly can also include an inboard base that defines a substantially planar upper surface that extends obliquely relative to the upper surface of the outboard base downward toward the vehicle passenger compartment. The outboard and inboard bases can be joined together to form a peak that is the vertically highest portion of the base assembly. A unitary topcoat can cover the upper surfaces of the outboard and inboard bases.

19 Claims, 3 Drawing Sheets

(56) References Cited

U.S. PATENT DOCUMENTS

| | | | |
|---|---|---|---|
| 4,861,097 A * | 8/1989 | Wycech | B60J 5/0437 296/146.6 |
| 5,095,655 A * | 3/1992 | Warren | B60J 10/24 49/374 |
| 5,181,759 A * | 1/1993 | Doolittle | B60N 2/466 296/153 |
| 5,482,344 A * | 1/1996 | Walker | B60R 21/0428 280/751 |
| 5,542,738 A * | 8/1996 | Walker | B60J 5/0451 296/146.6 |
| 5,857,702 A * | 1/1999 | Suga | B60J 5/0451 188/377 |
| 6,183,038 B1 * | 2/2001 | Hansen | B29C 44/12 296/146.6 |
| 6,210,613 B1 * | 4/2001 | Stein | B29C 44/12 264/45.4 |
| 6,422,640 B2 * | 7/2002 | Whitehead | B29C 37/0032 296/146.7 |
| 6,447,047 B1 * | 9/2002 | Marcovecchio | B60R 13/0243 296/146.6 |
| 6,668,490 B2 | 12/2003 | Hock et al. | |
| 6,723,263 B2 * | 4/2004 | Whitehead | B29C 44/12 264/259 |
| 6,851,740 B1 * | 2/2005 | Peng | B62D 21/157 296/187.02 |
| 6,857,688 B2 * | 2/2005 | Morrison | B60J 5/0416 296/146.6 |
| 7,144,032 B2 * | 12/2006 | Lunt | B60R 21/21 280/728.2 |
| 7,500,712 B2 | 3/2009 | Hirooka et al. | |
| 7,552,940 B2 * | 6/2009 | Lindemann | B60R 21/21 280/728.2 |
| 7,766,380 B2 * | 8/2010 | Tonooka | B60R 21/21 280/728.2 |
| 8,119,725 B2 | 2/2012 | Lustiger et al. | |
| 8,152,218 B2 * | 4/2012 | Hall | B60J 5/0451 296/146.6 |
| 8,210,590 B1 * | 7/2012 | Moberg | B60J 5/042 224/544 |
| 8,317,253 B2 | 11/2012 | Sachdev et al. | |
| 8,322,078 B2 * | 12/2012 | Brancaleone | B60J 5/0402 49/490.1 |
| 8,418,408 B2 * | 4/2013 | Yasuhara | B60J 5/0426 296/146.6 |
| 8,596,710 B2 * | 12/2013 | Naeg | B60J 5/06 296/146.4 |
| 8,727,420 B2 * | 5/2014 | Yasuhara | B60J 5/0426 296/146.5 |
| 8,910,999 B2 * | 12/2014 | Schurter | B60J 5/0415 296/146.2 |
| 9,033,395 B2 | 5/2015 | Gerhardt et al. | |
| 9,180,830 B1 * | 11/2015 | Faruque | B60R 13/0243 |
| 9,248,729 B2 * | 2/2016 | Yi | B60J 10/041 |
| 9,656,538 B2 * | 5/2017 | Nakaguchi | B60J 5/0402 |
| 2014/0361576 A1 | 12/2014 | Storgato et al. | |
| 2015/0251524 A1 | 9/2015 | Goto | |

* cited by examiner

VEHICLE DOOR ASSEMBLIES, AND METHODS OF USE AND MANUFACTURE THEREOF

BACKGROUND

The disclosed subject matter relates to vehicle door assemblies, and methods of use and manufacture thereof. In particular, the disclosed subject matter relates to vehicle door structures that are at least visibly accessible from the vehicle interior, and that include base and exterior surfaces.

Many types of vehicles include doors and/or other structures that enable passenger ingress and/or egress. These vehicle doors are typically configured to be actuable (such as via pivoting or rotational movement) between an open position facilitating passenger ingress/egress, and a closed position impeding passenger ingress/egress. These types of vehicle doors in the closed position thereby operate as a barrier between the vehicle exterior and interior passenger compartment.

SUMMARY

Based on their operation as a barrier, these types of vehicle doors inherently include interior and exterior surfaces. The interior and exterior surfaces perform different functions and are subject to different operational challenges. For example, the exterior surfaces are typically required to be relatively resilient to conditions exterior of the vehicle, which may be intensified when the vehicle is traveling. The interior surfaces need to be resilient to conditions within the vehicle, which are typically less extreme than the exterior conditions.

However, the interior surfaces may be subject to other challenges. For example, the interior surfaces may provide various functions, such as providing a support for passenger actuable controls, i.e., raising/lowering a door window, locking/unlocking the door, etc. In addition, the interior surfaces may provide a surface configured for direct contact with a vehicle passenger, such as the case where the surface defines an arm rest.

In addition or as an alternative to the above, it may also be beneficial for the interior surfaces to be configured for aesthetics. Aesthetic considerations may be especially significant because these surfaces are proximate to the vehicle passengers and thus subject to relatively significant and close scrutiny.

It may therefore be beneficial to configure the vehicle door interior surfaces to enhance aesthetics while at the same time facilitating the functionality discussed above. For example, the orientation(s) of the surfaces can be tailored to interact or complement other surfaces, visually and/or operationally, to enhance aesthetics. In some of these cases, the vehicle door interior surfaces can be configured so as to take into account their visual appearance relative to the associated door belt line, which extends along a bottom surface of the vehicle door window in a longitudinal direction of the vehicle. As one example, it may be beneficial to provide an outboard base defining a relatively planar upper surface that is oriented at an angle relative to the vehicle transverse direction so as to face upwardly toward the vehicle exterior. It may also be beneficial to provide an inboard base defining a relatively planar upper surface that is also oriented at an angle relative to the vehicle transverse direction extending downward toward the vehicle interior. The outboard and inboard bases may be disposed so as to meet and form a common surface or line that extends in the vehicle longitudinal direction and that defines an uppermost surface of the outboard and inboard bases.

It may also be beneficial to provide a common exterior layer or topcoat to cover both the outboard and inboard bases. This common exterior layer/topcoat may provide a uniform and smooth appearance for both planar surfaces, thereby enhancing aesthetics.

Some embodiments are therefore directed to a door lining assembly for use with a vehicle that defines a vehicle exterior and a vehicle passenger compartment. The door lining assembly can include a base assembly including an outboard base that defines a substantially planar upper surface that extends obliquely relative to a transverse direction of the vehicle so as to face upwardly toward the vehicle exterior. The base assembly can also include an inboard base that defines a substantially planar upper surface that extends obliquely relative to the upper surface of the outboard base downward toward the vehicle passenger compartment. The outboard and inboard bases can be joined together to form a peak that is the vertically highest portion of the base assembly. A unitary topcoat can cover the upper surfaces of the outboard and inboard bases.

Some other embodiments are directed to a door assembly for use with a vehicle that defines a vehicle exterior and a vehicle passenger compartment. The door assembly can include a vehicle door, and a door lining assembly. The door lining assembly can include a base assembly including an outboard base that defines a substantially planar upper surface that extends obliquely relative to a transverse direction of the vehicle so as to face upwardly toward the vehicle exterior. The base assembly can also include an inboard base that defines a substantially planar upper surface that extends obliquely relative to the upper surface of the outboard base downward toward the vehicle passenger compartment. The outboard and inboard bases can be joined together to form a peak that is the vertically highest portion of the base assembly. A unitary topcoat can cover the upper surfaces of the outboard and inboard bases. The door assembly can also include an attachment fixture configured to attach the door lining assembly to the door.

Still other embodiments are directed to method of manufacturing a door lining assembly for use with a vehicle that defines a vehicle exterior and a vehicle passenger compartment. The method can include: configuring a base assembly to include an outboard base that defines a substantially planar upper surface that extends obliquely relative to a transverse direction of the vehicle so as to face upwardly toward the vehicle exterior; configuring the base assembly to also include an inboard base that defines a substantially planar upper surface that extends obliquely relative to the upper surface of the outboard base downward toward the vehicle passenger compartment; joining the outboard and inboard bases together to form a peak that is the vertically highest portion of the base assembly; and extending a unitary topcoat over the upper surfaces of the outboard and inboard bases.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of a door lining assembly 20 are disclosed below, and FIGS. 1-4 illustrate some of these embodiments. However, embodiments are intended to include or otherwise cover many different embodiments and structures for lining a vehicle door.

The embodiments are disclosed below and in the context of a front door assembly of an automobile. However, the embodiments are intended to be applicable to any automobile door assembly, any type of automobile, and any type of vehicle, and to further be applicable to non-vehicular doors.

Embodiments are also disclosed below in the context of a door lining assembly. However, embodiments are intended to include or otherwise cover any type of lining assembly, including lining assemblies for automobile panels configured without a door, such as panels adjacent window frames of third row seating configurations.

I. Vehicle and Door Lining Assembly

Figure 1:
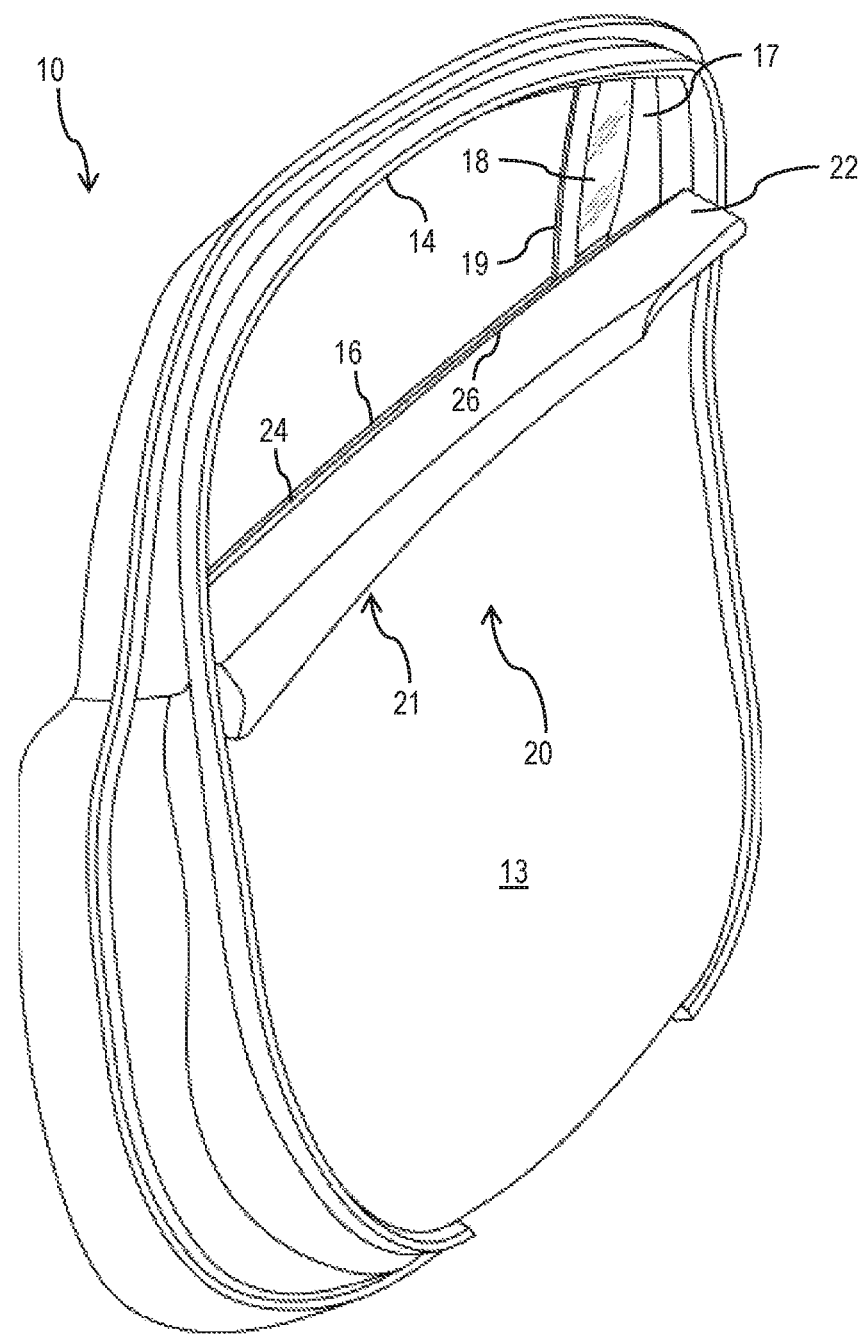
FIG. 1 is a perspective view of an interior side of an exemplary vehicle door in accordance with the disclosed subject matter.

FIG. 1 is a perspective view of an interior side of an exemplary door 10 of a vehicle in accordance with the disclosed subject matter. The vehicle may be primarily for use on paved roadways, and can be referred to as a passenger vehicle. However, as indicated above, the disclosed door lining assembly 20 can be used with any vehicle that is configured to travel along any one or combination of improved, unimproved, and unmarked roadways and paths constituted by gravel, dirt, sand, etc. For example, embodiments are intended to include or otherwise cover any other type of automobile, including passenger car, truck, ATV, etc. In fact, embodiments are intended to include or otherwise cover configurations of the door lining assembly 20 for use in any other type of vehicle, such as an aircraft, boat, ship, train, spacecraft, etc. Some other embodiments can be used in non-vehicular carrier applications, such as for amusement park rides, gondolas, or any other situation where lining can be applied to a door or window frame.

The exemplary door 10 of the vehicle can include a door frame 12 (FIG. 3) surrounding an outer panel (not shown) and an inner panel 13, and a window opening 14. The outer panel 11 and the inner panel 13 oppose each other to form a body panel of the door 10. The window opening 14 is disposed above the body panel formed of the outer and inner panels 13 so as to be proximate a roof of the vehicle. The inner panel 13 of the door 10 may include an armrest having multiple controls disposed therein, including switches for window actuation, door locking, mirror actuation, and any other control to be used by an occupant sitting adjacent the door 10. The inner panel 13 may also include a multitude of pockets, cupholders, compartments, etc.

In the present embodiment, the window opening 14 defines a belt-line 16 of the door 10, such that the belt-line 16 extends along a lower edge of the window opening 14 from a front portion of the door frame 12 to a rear portion. The window opening 14 can also include a quarter window 18 extending from the front portion of the door frame 12 along a portion of the belt-line 16, the quarter window 18 extending from the belt-line 16 to an upper edge of the window opening 14. In some configurations, the quarter window 18 can occupy a relatively small amount of the window opening 14, while other configurations may feature a relatively large amount of the window opening 14 being occupied by the quarter window 18. The window opening 14 can also include a quarter window pillar 19 disposed adjacent an edge of the quarter window 18 that extends from the belt-line 16 to the upper edge of the window opening 14. In some configurations, the window opening 14 may not include the quarter window 18, or the quarter window pillar 19. The window opening 14 may additionally include a pillar cover 17 extending along a portion of the window opening 14 adjacent the quarter window 18.

In the present embodiment, the door 10 also includes a door lining assembly 20 that can extend along the belt-line 16 on the inner panel 13. The door lining assembly 20 may include a topcoat 21 configured to cover base portions of the door lining assembly 20, which are described below. The topcoat 21 can include an inboard topcoat 22 and an outboard topcoat 24. The inboard and outboard topcoats 22, 24 have approximately planar surfaces extending a length of the door lining assembly 20. The topcoat 21 can contour closely to the base portions such that the inboard topcoat 22 and the outboard topcoat 24 are formed on either side of a topcoat peak 26. The inboard topcoat 22 is thereby configured to slant and face inward, towards an interior of the vehicle. On the other hand, the outboard topcoat 24 is configured to slant and face outward, away from the interior of the vehicle. Since the inboard and outboard topcoats 22, 24 obliquely intersect at the topcoat peak 26, the topcoat peak 26 can extend approximately a length of that intersection.

In the present embodiment, the topcoat 21 provides for a durable and clean surface finish style on the door lining assembly 20, and can be formed of fabric or any alternate material. For example, the topcoat 21 can be formed of a natural material (such as leather) or a synthetic material.

Figure 2:
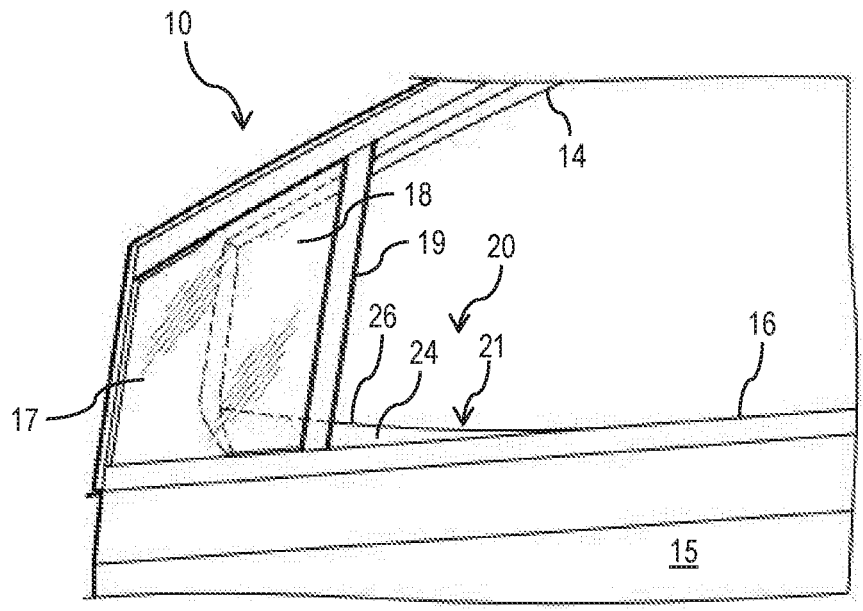
FIG. 2 is a partial perspective view of an exterior side of the exemplary vehicle door in accordance with the disclosed subject matter.

FIG. 2 is a partial perspective view of an exterior side of the exemplary door 10 in accordance with the disclosed subject matter. In the present embodiment, the lower edge of the window opening 14 defining the belt-line 16 is shown extending along an upper edge of the outer shell 15 of the door 10. The belt-line 16 can include molding attached to the door 10, such as a weatherstrip or guard, or may alternatively define an edge between the window opening 14 and the outer shell 15.

Also shown in FIG. 2, the pillar cover 17 is visible through the quarter window 18 of the door 10 from the exterior of the vehicle. As described below, the door lining assembly 20 of the present embodiment extends along the belt-line 16 on the inner panel 13, such that the front portion of the door lining assembly 20 abuts the pillar cover 17. In other embodiments, the door lining assembly 20 may terminate before the pillar cover 17, or alternatively extend beyond the pillar cover 17.

In the present embodiment, the door lining assembly 20, as well as the topcoat 21 that covers the door lining assembly 20, is configured to extend along the belt-line 16 before deviating upward and away from the belt-line 16 as the door lining assembly 20 approaches the pillar cover 17. In this manner, the door lining assembly 20 of the present embodiment curves upward away from the belt-line 16 as the door lining assembly 20 extends forward from the rear portion of the door 10 to the front portion. As previously described, the door lining assembly 20 of the present embodiment may curve in a concave manner up from the belt-line 16, or alternatively, the door lining assembly 20 can simply extend upwards from the belt-line 16 in an approximately straight planar slant. As the door lining assembly 20 deviates upward from the belt-line 16, the outboard topcoat 24 and the topcoat peak 26 (to which the outboard topcoat 24 extends) are visible from the exterior of the vehicle. Because the pillar cover 17 is disposed fore of at least a portion of the quarter window 18, as well as the quarter window pillar 19, in the present embodiment, a portion of the outboard topcoat 24 is visible through the quarter window 18 from the exterior of the vehicle. In embodiments configured without the quarter window 18, the outboard topcoat 24 may be exposed to the exterior of the vehicle from where it deviates from the belt-line 16 to where it meets the pillar cover 17.

Figure 3:
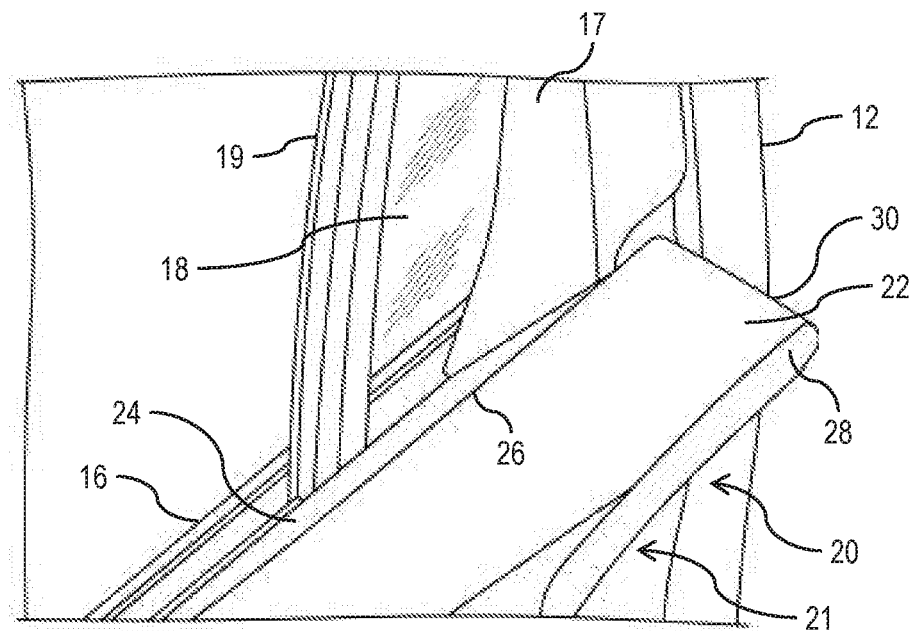
FIG. 3 is a partial perspective view of the interior side of the exemplary vehicle door in accordance with the disclosed subject matter.

FIG. 3 is a partial perspective view of the interior side of the exemplary door 10 of the vehicle in accordance with the disclosed subject matter. Particularly, FIG. 3 shows a portion of the door lining assembly 20 that deviates above the belt-line 16 as it approaches the pillar cover 17 proximate a front side of the door frame 12. Slant angles of the door lining assembly 20 result in the outboard topcoat 24 facing outward and away from the interior of the vehicle, such that the outboard topcoat 24 extends obliquely from the belt-line 16 towards the topcoat peak 26. Contrarily, the inboard topcoat 22 can face inward and towards the interior of the vehicle, such that the inboard topcoat 22 also extends towards the topcoat peak 26 at an angle relative to the outboard topcoat 24. The inboard and outboard topcoats 22, 24 can be planar, approximately planar, or otherwise contoured.

Also shown in FIG. 3, the door lining assembly 20 of the present embodiment can include a side edge 28 and a front edge 30. The side edge 28 can extend along an interior side of the inboard topcoat 22, and can define a width of the inboard topcoat 22. The side edge 28 can be rounded, beveled or chamfered, or otherwise planar so as to extend from the inboard topcoat 22 at any angle. The front edge 30 can extend along a front side of the inboard topcoat 22 proximate the front side of the door 10, thereby defining a length from a back edge of the inboard topcoat 22. The front edge 30 can be rounded, beveled or chamfered, or otherwise planar so as to extend from the inboard topcoat 22 at any angle.

Figure 4:
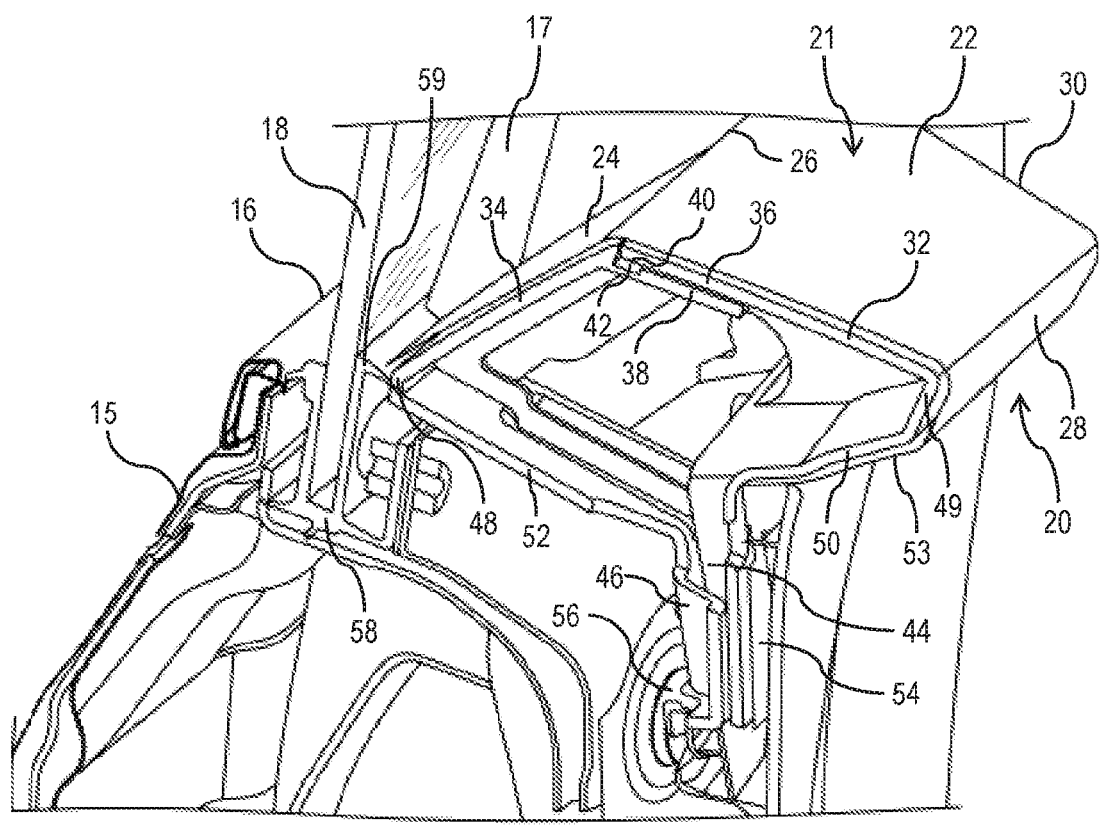
FIG. 4 is a cross-sectional perspective view of a part of the exemplary vehicle door in accordance with the disclosed subject matter.

FIG. 4 is a cross-sectional perspective view of a part of the exemplary door 10 of FIG. 3 in accordance with the disclosed subject matter. The cross-sectional view in FIG. 4 reveals an inboard base 32 and an outboard base 34 adhered together and then completely enveloped by the topcoat 21 to form the door lining assembly 20.

In the present embodiment, the inboard base 32 has a primary surface disposed adjacent and underneath the inboard topcoat 22, the inboard topcoat 22 being wrapped to cover and follow the primary surface of the inboard base 32. The outboard base 34 also has a primary surface disposed adjacent and underneath the outboard topcoat 24, the outboard topcoat 24 being wrapped to cover and follow the primary surface of the outboard base 34. The inboard and outboard bases 32, 34 are joined at overlapping portions to form the topcoat peak 26, which is described below.

The inboard base 32 of the present embodiment can include an inboard overlap 36 having an inboard protrusion 40 disposed thereon, with the inboard protrusion 40 extending along an edge of the inboard base 32 proximate the topcoat peak 26. The inboard overlap 36 can be configured to overlap with an outboard overlap 38 of the outboard base 34, which is described below. Specifically, the inboard protrusion 40 can extend downward towards the outboard overlap 38. In some embodiments, the inboard protrusion 40 is formed as an elongated hook, while in other embodiments the inboard protrusion 40 can be configured as any type of catch for securing the inboard overlap 36 to the outboard overlap 38.

The outboard base 34 of the present embodiment can include the outboard overlap 38 having an outboard channel 42 disposed thereon, with the outboard channel 42 extending along a portion of the outboard base 34 proximate the topcoat peak 26. The outboard overlap 38 is configured to obliquely extend from the primary surface of the outboard base 34 parallel to the primary surface of the inboard base 32. Particularly, the outboard overlap 38 extends along the inboard overlap 36 for a sufficient distance to secure the inboard base 32 and the outboard base 34 together. Due to the orientation of the inboard and outboard overlaps 36, 38, the inboard protrusion 40 is configured to be inserted within the outboard channel 42, thereby locking the inboard and outboard bases 32, 34 together adjacent the topcoat peak 26. The outboard channel 42 can be configured as a slot, groove, or other recessed portion capable of engagement with the inboard protrusion 40. Alternatively, the inboard overlap 36 can include a channel to engage a protrusion disposed on the outboard overlap 38. Furthermore, the engagement between the inboard protrusion 40 and the outboard channel 42 can occur anywhere along the inboard and outboard overlaps 36, 38, and is not limited to a portion adjacent the topcoat peak 26. The inboard and outboard overlaps 36, 38 can also extend the entire length of the door lining assembly 20, or a partial length.

In the present embodiment, the inboard base 32 is configured to include the primary surface adjacent the inboard topcoat 22, as well as an inboard edge 49, an inboard lower side 50, and an inboard lower portion 44. The inboard base 32 can be configured such that the inboard edge 49 extends downward from the primary surface, the inboard lower side 50 extends from the inboard edge 49 outward towards the outboard base 34, and the inboard lower portion 44 extends downward from the inboard lower side 50. The inboard lower portion 44 can be configured to abut an outboard lower portion 46 of the outboard base 34, as described below. Furthermore, the topcoat 21 of the present embodiment is wrapped around the primary surface, the inboard edge 49, the inboard lower side 50, and the inboard lower portion 44 of the inboard base 32 so as to completely envelop and cover surfaces of the aforementioned elements defining an exterior of the inboard base 32. Particularly, the topcoat 21 includes an under topcoat 53 and a lower topcoat 54 as portions wrapping around the inboard lower side 50 and the inboard lower portion 44, respectively.

Similarly, the outboard base 34 is configured to include the primary surface adjacent the outboard topcoat 24, as well as an outboard edge 48, an outboard lower side 52, and the outboard lower portion 46. The outboard base 34 can be configured such that the outboard edge 48 extends downward from the primary surface, the outboard lower side 52 extends from the outboard edge 48 inward towards the inboard base 32, and the outboard lower portion 46 extends downward from the outboard lower side 52. As described above, the outboard lower portion 46 can be configured to abut the inboard lower portion 44 of the inboard base 32, and may have a protruding portion to overlap and/or interlock with the inboard lower portion 44. In the present embodiment, the topcoat 21 is wrapped around the primary surface of the outboard base 34 from the topcoat peak 26 to an edge of the primary surface from which the outboard edge 48 extends, and which abuts a weather-strip 58 disposed along a base of the quarter window 18, as described below. The topcoat 21 is thereby configured to completely envelop and cover the primary surface of the outboard base 34.

As described above, the topcoat 21 of the present embodiment wraps around the inboard and outboard bases 32, 34 so as to span from the edge of the primary surface which abuts the weather-strip 58, across the topcoat peak 26 to then cover the above described surfaces defining the exterior of the inboard base 32.

In FIG. 4, the weather-strip 58 is shown disposed at the base of the quarter window 18, with the weather-strip 58 being approximately aligned with the belt-line 16 of the door 10. The weather-strip 58 can include an interior strip 59 extending upward along an interior side of the base of the quarter window 18. The interior strip 59 can be configured to abut the outboard base 34 at the outboard edge 48, as well as a portion of the topcoat 21, specifically the outboard topcoat 24, that terminates at the outboard edge 48. In this manner, the topcoat 21 can be oriented to mate to the interior strip 59 to form a close fit or seal. The weather-strip 58 can be rubber or any other type of semi-pliable material to fit between the quarter window 18 and the edge of the topcoat 21 aligned with the outboard edge 48.

The present embodiment can include an attachment fixture 56 disposed within an interior of the inner panel 13 of the door 10 to attach the door lining assembly 20 to the door 10. Particularly, the outboard lower portion 46 can include a complementary fixture for attachment to the attachment fixture 56. The attachment fixture 56 can thereby serve to align and secure the door lining assembly 20 to the door 10.

II. Alternative Embodiments

In the disclosed embodiment, various structures are applied to a door lining assembly of a vehicle door. However, the disclosed structures may alternatively be applied to or modified to include or otherwise cover any type of lining assembly, including lining assemblies for automobile panels configured without a door, such as panels adjacent window frames of third row seating configurations.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

In the disclosed exemplary embodiments, the door lining assembly is attached to the front door of the vehicle. However, the lining assembly can be attached to any component of the vehicle where it is desirable to cover or line body panels, such as the dashboard, roofline, pillars, etc.

Embodiments are also intended to include or otherwise cover methods of using and methods of manufacturing any or all of the elements disclosed above. The methods of manufacturing include or otherwise cover processors and computer programs implemented by processors used to design various elements of the vehicle door adjuster disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A door lining assembly for use with a vehicle that defines a vehicle exterior and a vehicle passenger compartment, comprising:
   a base assembly including an outboard base that defines a substantially planar upper surface that extends obliquely relative to a transverse direction of the vehicle so as to face upwardly toward the vehicle exterior, the base assembly also including an inboard base that defines a substantially planar upper surface that extends obliquely relative to the upper surface of the outboard base downward toward the vehicle passenger compartment, the outboard and inboard bases being joined together to form a peak that is the vertically highest portion of the base assembly; and
   a unitary topcoat that covers the upper surfaces of the outboard and inboard bases.

2. The door lining assembly according to claim 1, wherein the unitary topcoat includes an inboard topcoat that covers the upper surface of the inboard base, and an outboard topcoat that covers the upper surface of the outboard base, the portion of the unitary topcoat that extends over the peak forming a topcoat peak that is the vertically highest portion of the door lining assembly.

3. The door lining assembly according to claim 1, wherein the inboard and outboard bases are joined together at overlapping portions that include an inboard overlapping portion and an outboard overlapping portion to form the topcoat peak.

4. The door lining assembly according to claim 3, wherein the inboard overlapping portion includes an inboard protrusion that extends downwardly away from the unitary topcoat and that is disposed proximate the topcoat peak.

5. The door lining assembly according to claim 4, wherein the outboard overlapping portion includes an outboard channel that is disposed proximate the topcoat peak.

6. The door lining assembly according to claim 5, wherein the inboard protrusion is configured to engaged the outboard channel to thereby secure the inboard and outboard bases together.

7. The door lining assembly according to claim 2, wherein the inboard base includes a most inboard edge that extends downwardly from the upper surface of the inboard base, an inboard lower side that extends from the most inboard edge toward the outboard base, and an inboard lower portion that extends downwardly from the inboard lower side.

8. The door lining assembly according to claim 7, wherein the inboard topcoat is configured to extend over the upper surface, the most inboard edge, the inboard lower side, and the inboard lower portion of the inboard base.

9. The door lining assembly according to claim 2, wherein the outboard base includes a most outboard edge that extends downwardly from the upper surface of the inboard base, an outboard lower side that extends inwardly from the most outboard edge toward the inboard base, and an outboard lower portion that extends downwardly from the outboard lower side.

10. The door lining assembly according to claim 9, wherein the outboard topcoat is configured to extend over the upper surface, most outboard edge, outboard lower side, and outboard lower portion of the outboard base.

11. A door assembly for use with a vehicle that defines a vehicle exterior and a vehicle passenger compartment, comprising:
   a vehicle door;
   a door lining assembly that includes:
      a base assembly including an outboard base that defines a substantially planar upper surface that extends obliquely relative to a transverse direction of the vehicle so as to face upwardly toward the vehicle exterior, the base assembly also including an inboard base that defines a substantially planar upper surface that extends obliquely relative to the upper surface of the outboard base downward toward the vehicle passenger compartment, the outboard and inboard bases being joined together to form a peak that is the vertically highest portion of the base assembly; and
      a unitary topcoat that covers the upper surfaces of the outboard and inboard bases; and
   an attachment fixture configured to attach the door lining assembly to the door.

12. The door assembly according to claim 11, wherein the unitary topcoat includes an inboard topcoat that covers the upper surface of the inboard base, and an outboard topcoat that covers the upper surface of the outboard base, the portion of the unitary topcoat that extends over the peak forming a topcoat peak that is the vertically highest portion of the door lining assembly.

13. The door assembly according to claim 11, wherein the inboard and outboard bases are joined together at overlapping portions that include an inboard overlapping portion and an outboard overlapping portion to form the topcoat peak.

14. The door assembly according to claim 13, wherein the inboard overlapping portion includes an inboard protrusion that extends downwardly away from the unitary topcoat and that is disposed proximate the topcoat peak.

15. The door assembly according to claim 14, wherein the outboard overlapping portion includes an outboard channel that is disposed proximate the topcoat peak.

16. The door lining assembly according to claim 15, wherein the inboard protrusion is configured to engaged the outboard channel to thereby secure the inboard and outboard bases together.

17. The door assembly according to claim 12, wherein the inboard base includes a most inboard edge that extends downwardly from the upper surface of the inboard base, an inboard lower side that extends from the most inboard edge toward the outboard base, and an inboard lower portion that extends downwardly from the inboard lower side.

18. The door assembly according to claim 17, wherein the inboard topcoat is configured to extend over the upper surface, the most inboard edge, the inboard lower side, and the inboard lower portion of the inboard base.

19. The door assembly according to claim 12, wherein the outboard base includes a most outboard edge that extends downwardly from the upper surface of the inboard base, an outboard lower side that extends inwardly from the most outboard edge toward the inboard base, and an outboard lower portion that extends downwardly from the outboard lower side; and wherein the outboard topcoat is configured to extend over the upper surface, most outboard edge, outboard lower side, and outboard lower portion of the outboard base.

* * * * *